US006816131B2

(12) United States Patent
Narui et al.

(10) Patent No.: US 6,816,131 B2
(45) Date of Patent: Nov. 9, 2004

(54) SINGLE HORIZONTAL SCAN RANGE CRT MONITOR

(75) Inventors: Yoshihisa Narui, San Diego, CA (US); Pablo A. Espinosa, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/880,585

(22) Filed: Jun. 13, 2001

(65) Prior Publication Data

US 2002/0030695 A1 Mar. 14, 2002

Related U.S. Application Data

(63) Continuation of application No. 09/422,484, filed on Oct. 21, 1999, now Pat. No. 6,313,813.

(51) Int. Cl.[7] .............................. G09G 5/00; H04N 7/01
(52) U.S. Cl. ......................................... 345/3.2; 348/441
(58) Field of Search .......................... 345/3.2, 132, 3.3; 348/441, 558, 445

(56) References Cited

U.S. PATENT DOCUMENTS

| 4,058,835 | A | | 11/1977 | Kennedy ....................... 348/22 |
| 4,408,197 | A | * | 10/1983 | Komatsu et al. ............... 345/27 |
| 4,504,852 | A | | 3/1985 | Ducret ......................... 348/441 |
| 4,646,151 | A | | 2/1987 | Welles, II et al. |
| 4,673,929 | A | * | 6/1987 | Nelson et al. ................. 345/22 |
| 4,918,436 | A | | 4/1990 | Johary |
| 5,159,683 | A | | 10/1992 | Lvovsky et al. |
| 5,189,401 | A | | 2/1993 | Kugler, Jr. et al. |
| 5,218,274 | A | | 6/1993 | Zenda ......................... 315/366 |
| 5,289,277 | A | | 2/1994 | Blanchard et al. |
| 5,396,258 | A | | 3/1995 | Zenda ......................... 345/204 |
| 5,485,216 | A | | 1/1996 | Lee |
| 5,534,883 | A | | 7/1996 | Koh ............................ 345/3.2 |
| 5,602,567 | A | | 2/1997 | Kanno |
| 5,608,418 | A | | 3/1997 | McNally |
| 5,629,715 | A | | 5/1997 | Zenda |
| 5,796,442 | A | * | 8/1998 | Gove et al. ................. 348/556 |
| 5,812,210 | A | | 9/1998 | Arai et al. |
| 5,815,135 | A | | 9/1998 | Yui et al. ..................... 345/3.2 |
| 5,867,178 | A | | 2/1999 | Murphy et al. .............. 345/534 |
| 5,870,073 | A | | 2/1999 | Kitou et al. |
| 5,896,177 | A | * | 4/1999 | Hwang ........................ 348/445 |
| 5,910,806 | A | | 6/1999 | Narui et al. |
| 5,912,710 | A | * | 6/1999 | Fujimoto ..................... 348/445 |
| 5,978,041 | A | * | 11/1999 | Masuda et al. .............. 348/563 |
| 5,986,707 | A | * | 11/1999 | Geshwind .............. 375/240.01 |
| 6,014,126 | A | | 1/2000 | Nishihara .................... 345/3.2 |
| 6,057,889 | A | | 5/2000 | Reitmeier et al. |

(List continued on next page.)

FOREIGN PATENT DOCUMENTS

| EP | 0 875 882 A3 | 4/1998 |
| EP | 0 875 882 A2 | 4/1998 |
| WO | WO 99/16243 | 4/1999 |

Primary Examiner—Jeffery Brier
Assistant Examiner—Ryan Yang
(74) Attorney, Agent, or Firm—Thomas F. Lebens; Fitch, Even, Tabin & Flannery

(57) ABSTRACT

A single horizontal scan range CRT monitor that includes a receiver for receiving display signals in a digital format from an external source, the initial display signals having one of a plurality of input resolutions, and a converter connected to the receiver and supplied with the initial display signals for detecting the input resolution of the initial display signals and converting the initial display signals to digital output signals having an output resolution selected from a plurality of different output resolutions matched to the detected input resolution of the initial display signals, and wherein all of the plurality of output resolutions have a same horizontal resolution and all of the digital output signals have a same horizontal frequency.

47 Claims, 7 Drawing Sheets

U.S. PATENT DOCUMENTS

| | | | | |
|---|---|---|---|---|
| 6,069,663 A | * | 5/2000 | Bessel et al. | 348/441 |
| 6,118,486 A | | 9/2000 | Reitmeier | 348/435.1 |
| 6,137,902 A | * | 10/2000 | Kinoshita et al. | 382/154 |
| 6,139,360 A | | 10/2000 | Hayashi et al. | 439/502 |
| 6,144,362 A | * | 11/2000 | Kawai | 345/629 |
| 6,226,040 B1 | * | 5/2001 | Kuo et al. | 345/212 |
| 6,307,543 B1 | | 10/2001 | Martin | 345/213 |
| 6,331,862 B1 | * | 12/2001 | Yamada et al. | 345/660 |
| 6,353,460 B1 | * | 3/2002 | Sokawa et al. | 348/554 |
| 6,411,267 B1 | * | 6/2002 | Narui | 345/10 |
| 6,466,272 B1 | * | 10/2002 | Arai et al. | 348/555 |
| 6,550,700 B1 | * | 4/2003 | Griebat et al. | 241/30 |

\* cited by examiner

| Input | Converted | fH(kHz) | fV(Hz) | Clock (MHz) |
|---|---|---|---|---|
| 640x480 | 1400x960 | 80 | 79.9 | 151.68 |
| 720x400 | 1400x800 | 80 | 95.1 | 151.68 |
| 800x600 | 1400x600 | 80 | 124.8 | 151.68 |
| 1024x768 | 1400x768 | 80 | 98.9 | 151.68 |
| 1152x864 | 1400x864 | 80 | 88.4 | 151.68 |
| 1280x1024 | 1400x1024 | 80 | 75.1 | 151.68 |

FIG. 9A

| Input | Converted | fH(kHz) | fV(Hz) | Clock (MHz) |
|---|---|---|---|---|
| 640x480 | 1280x960 | 80 | 79.9 | 138.24 |
| 720x400 | 720x800 | 80 | 95.1 | 78.08 |
| 800x600 | 800x600 | 80 | 124.8 | 87.04 |
| 1024x768 | 1024x768 | 80 | 98.9 | 111.36 |
| 1152x864 | 1152x864 | 80 | 88.4 | 125.44 |
| 1280x1024 | 1280x1024 | 80 | 75.1 | 138.24 |

FIG. 9B

SINGLE HORIZONTAL SCAN RANGE CRT MONITOR

This application is a Continuation of U.S. patent application Ser. No. 09/422,484, filed Oct. 21, 1999, entitled "SINGLE HORIZONTAL SCAN RANGE CRT MONITOR", now U.S. Pat. No. 6,313,813, the entirety of which is hereby incorporated by reference.

BACKGROUND OF THE INVENTION

This invention relates to computer monitors and, more particularly, to a single horizontal scan range cathode ray tube (CRT) monitor for use with personal computers having differing output display signal formats.

There is little standardization among personal computer (PC) manufacturers for the resolution and frequency of the display signals generated by the display cards of the PCs. On the other hand, it is generally more expensive and complicated to make analog monitors which can adapt to a plurality of display signal frequencies. One such possible arrangement is shown in FIG. 1. In this arrangement a PC 10 includes a display card (not shown) having a digital to analog (D/A) converter 12 to output analog display signals, at a frequency and resolution set by the PC, to a CRT multiple scanning frequency monitor 14. The monitor 14 has to detect the frequency and adjust its scanning frequency to match that of the initial display signals. Such a monitor is complex and expensive to build.

Still another possible monitor display arrangement is illustrated in FIG. 2. Again the PC 10 includes a display card (not shown) having a digital to analog (D/A) converter 12 to output analog display signals, at a frequency and resolution set by the PC, to a single scan frequency liquid crystal display (LCD) monitor 16.

The LCD monitor 16 includes an A/D converter 18 that converts the received analog signals into digital signals. A scaling engine 20 within the LCD monitor 16 converts the digital display signals into a frequency and resolution that are compatible with the LCD monitor 16 and supplies them to a display circuit (not shown) within the LCD monitor 16. In this arrangement, the A/D converter and the LCD panel are expensive.

Yet another possible arrangement is illustrated in FIG. 3. In this arrangement the PC 10 includes a display card (not shown) having a digital to analog (D/A) converter 12 to output analog display signals, at a frequency and resolution set by the PC, to an A/D converter 24 of a single scan CRT monitor 22. The output of the A/D converter 24 is supplied to a scaling engine 26 that converts the digital display signals into a frequency and resolution that are compatible with the CRT monitor 22 and supplies them to a D/A converter 28. The analog output display signals of the DIA converter 28 are supplied to the monitor 22 for display at a resolution and frequency compatible with the monitor. The disadvantages of this arrangement are also that it is complex to manufacture and expensive.

Lastly, in the possible arrangement of FIG. 4, a PC 30 having an internal scaling engine 32 outputs digital display signals at a resolution and frequency compatible with a single scan LCD monitor 16. While this arrangement has the advantage of a lower cost host, the LCD panel is still expensive for general use, e.g. in desktop PCs.

What is needed is a single horizontal scan range monitor, preferably a CRT monitor, that is inexpensive, not complex to make, and allows the monitor to be compatible with PCs having display circuits that output display signals at a variety of different scanning frequencies and display resolutions.

SUMMARY OF THE INVENTION

The above and other objectives are obtained by the present invention of a single horizontal scan range monitor that accepts display signals in a digital format from an external source, such as a personal computer. The initial display signals can have one of a plurality of input resolutions and scanning frequencies. A converter supplied with the initial display signals detects the particular input resolution of the initial display signals and converts them to digital output signals having a vertical output resolution selected from a plurality of different output resolutions matched to the detected input resolution of the initial display signals and a horizontal scanning frequency that is the same as the horizontal scanning frequency of the monitor.

Preferably the monitor is a cathode ray tube (CRT) monitor. In some embodiments, the initial display signals are converted to output signals having a single predetermined horizontal resolution, regardless of the horizontal resolution of the initial display signals. In one preferred embodiment, the converter is an integrated circuit chip.

The monitor includes a display data input for receiving the initial display data. This display data input can be a receiver where the external source transmits the initial display data in the digital format. In some preferred embodiment, the converter is a circuit that includes a frame memory. The display signal conversion is accomplished by controlling the data writing and reading rates to the frame memory. The converter includes, in addition to the frame memory, a resolution detector for detecting the resolution of the initial display signals and outputting a resolution detection signal and a first multiplexer connected between the display data input, the frame memory, and the monitor for switching between writing the initial display signals into the frame memory and reading the digital output signals out of the frame memory to the monitor. An address counter controller controls the addresses at which data are written into the frame memory and read out from the frame memory. A vertical sync generator connected to the resolution detector generates a vertical sync pulse for the monitor at a selected one of a plurality of vertical sync frequencies as a function of the detected resolution of the initial display signals. A horizontal sync generator generates a horizontal sync pulse at the single horizontal scanning frequency of the monitor. A data output clock generator generates a data output clock signal as a product of the single horizontal scanning frequency and a multiplier factor equal to the sum of the horizontal output resolution and a horizontal blanking interval.

A second multiplexer receives from the display data input a clock and a vertical sync signal. The second multiplexer is connected to the address counter, the data output clock signal generator, and the horizontal sync generator for selectively supplying to the address counter controller either the combination of the vertical sync signal and the clock from the display data input or the combination of the data output clock signal from the data output clock generator and the horizontal sync pulse from the horizontal sync generator. A sector controller controls the first multiplexer and the second multiplexer to synchronously and alternately write the initial display data to the frame memory at initial resolutions and scanning frequencies and read the digital output data signals from the frame memory to the monitor at resolutions and scanning frequencies that are compatible with the monitor.

In embodiments where the converter resides in the monitor, it is preferable to have the display signals transmitted by the PC to the monitor in digital form. A receiver is incorporated as part of the display data input of the monitor and receives the digital display signals and forwards them to the converter. In the preferred embodiments, the receiver is one of a transition-minimized differential scaling (TMDS) receiver, a low voltage differential signaling (LVDS) receiver, a low voltage differential signaling display interface (LDI) receiver, and a gigabit video interface (GVIF) receiver.

In one preferred embodiment wherein the receiver is a TMDS receiver, the clock from the receiver is a transition minimized differential scaling (TMDS) clock signal. The horizontal sync generator includes a phase locked loop (PLL) circuit for generating the data output clock. In the preferred embodiment, the horizontal sync generator generates horizontal sync pulses at a frequency of 80 kHz. The vertical sync generator generates vertical sync pulses at a selected one of the following frequencies in correspondence with the resolution detection signal: 79.9 Hz, 95.1 Hz, 124.8 Hz, 98.9 Hz, 88.4 Hz, and 75.1 Hz.

The converters of some of the above-discussed preferred embodiments, particularly those wherein the converter is a integrated circuit, convert the resolution of the initial display signals according to the following table:

| Input | Converted | fH(kHz) | fV(Hz) | Clock (MHz) |
| --- | --- | --- | --- | --- |
| 640 × 480 | 1400 × 960 | 80 | 79.9 | 151.68 |
| 720 × 400 | 1400 × 800 | 80 | 95.1 | 151.68 |
| 800 × 600 | 1400 × 600 | 80 | 124.8 | 151.68 |
| 1024 × 768 | 1400 × 768 | 80 | 98.9 | 151.68 |
| 1152 × 864 | 1400 × 864 | 80 | 88.4 | 151.68 |
| 1280 × 1024 | 1400 × 1024 | 80 | 75.1 | 151.68 | where "Input" is the resolution in pixels of the initial display signals, "Converted" is the resolution in pixels of the display output signals, "fH" is the horizontal frequency of the display output signals in Kilohertz, "fVHz" is the vertical sync frequency of the display output signals, and "Clock" is the data output clock in Megahertz (which is computed by multiplying fH×(horizontal resolution)×(a constant). In these examples the constant is approximately 1.35.

In still other embodiments, the conversion of the resolution of the initial display signals is according to the following table:

| Input | Converted | fH(kHz) | fV(Hz) | Clock (MHz) |
| --- | --- | --- | --- | --- |
| 640 × 480 | 1280 × 960 | 80 | 79.9 | 138.24 |
| 720 × 400 | 720 × 800 | 80 | 95.1 | 78.08 |
| 800 × 600 | 800 × 600 | 80 | 124.8 | 87.04 |
| 1024 × 768 | 1024 × 768 | 80 | 98.9 | 111.36 |
| 1152 × 864 | 1152 × 864 | 80 | 88.4 | 125.44 |
| 1280 × 1024 | 1280 × 1024 | 80 | 75.1 | 138.24 | where the constant for computing the Clock is approximately 1.36.

The invention also encompasses the methods embodied in the processing steps carried out by the elements of the above described single horizontal scan range monitors.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIGS. 9A and 9B are tables of conversion frequencies and resolutions performed by the invention in two different embodiments.

DETAILED DESCRIPTION OF THE PREFERRED EMBODIMENTS

Figure 5:
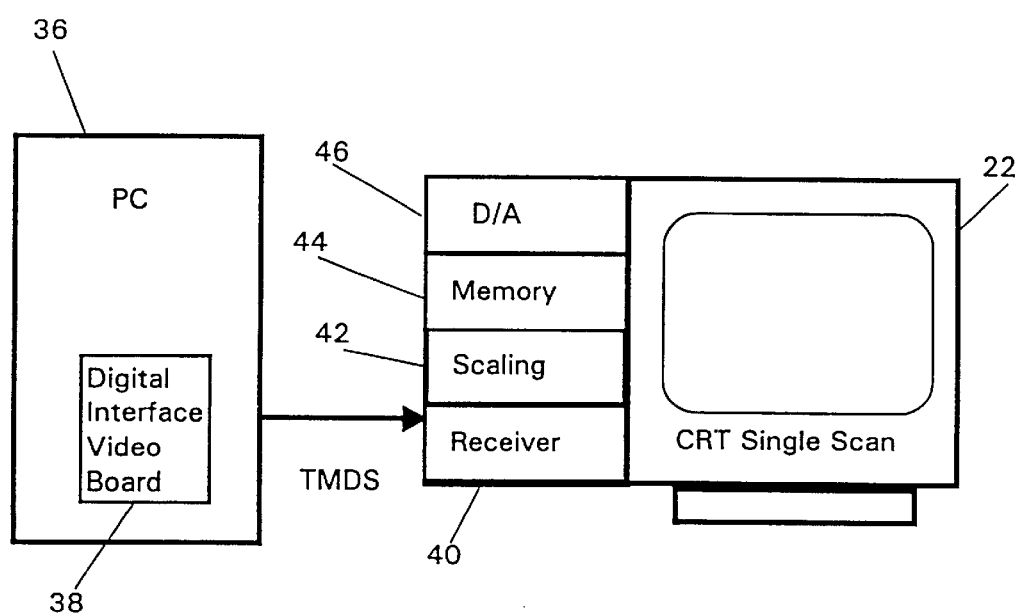
FIG. 5 is a block diagram of a first embodiment of the invention that employs a digital interface video board in the PC that outputs digital display signals to a CRT single scanning frequency monitor incorporating a digital display signal receiver, memory, scaling engine, and D/A converter.

Referring now more particularly to FIG. 5, a first embodiment of the invention includes a PC 36 having a digital video interface board 38 that acts as a digital display data transmitter. The transmitter can be any one of a transition minimized differential scaling (TMDS) transmitter, a low voltage differential signaling (LVDS) transmitter, a low voltage differential signaling display interface (LDI) transmitter, or a gigabit video interface (GVIF) transmitter. The PC 36 outputs digital display data according to the transmitter's format for resolution, fH and fV. In the preferred embodiment, the transmitter is a TMDS transmitter that transmits encoded RGB video display data and is manufactured by Genesis Microchip Inc.

The digital data from the PC 36 is supplied to a CRT single scanning frequency monitor 22 by means of a cable connection or the like. At the CRT monitor 22, the input display data outputted by the PC 36 is received at a receiver 40 corresponding to the transmitter 38, that is, the receiver 40 is a corresponding TMDS, LVDS, LDI, or GVIF receiver. In this example, it is a TMDS receiver manufactured by Silicon Image as model no. Sil 151. The receiver 40 outputs the received digital display data to a scaling engine 42 within the CRT monitor 22.

This scaling engine 42 performs a conversion of the digital display signals output by the PC 36 and received by the receiver 40. This conversion can be according to the terms of FIG. 9A. For example, for display signals having an original resolution of 640×480 pixels, the scaling engine 42 outputs digital display signals having a resolution of 1400× 960 pixels at a horizontal scanning frequency (fH) of 80 kHz and a vertical scanning frequency (fV) of 79.9 Hz. The data output clock is at the frequency of 151.68 MHz. On the other hand, if the original resolution of the display signals is 1024×768 pixels, the scaling engine 42 converts these signals to digital display signals having a resolution of 1400×768 pixels, an fH of 80 kHz and an fV of 98.9 MHz. In this embodiment, the horizontal resolution of the output digital display signals is a constant 1400 pixels irrespective of the horizontal resolution of the initial display data.

The scaling engine 42 can be embodied in an integrated chip of the type described in U.S. Pat. No. 5,602,599 and manufactured by Genesis Microchip Inc., 1999 Concourse Dr., San Jose, Calif. 95131 as models gmZ1, gmZ2, gmZ3, gmZd1, or gmZRX1. Scaling engine 42 can also be a specially programmed microcomputer.

The scaling engine 42 utilizes either an on-board memory or a memory 44 within the CRT 22 to render the conversion. This memory can be, for example, dynamic random access memory (DRAM). The digital display signal output from the scaling engine 42 is converted by a D/A converter (actually separate D/A converters for each color) and displayed on the single scan CRT 22.

Figure 6:
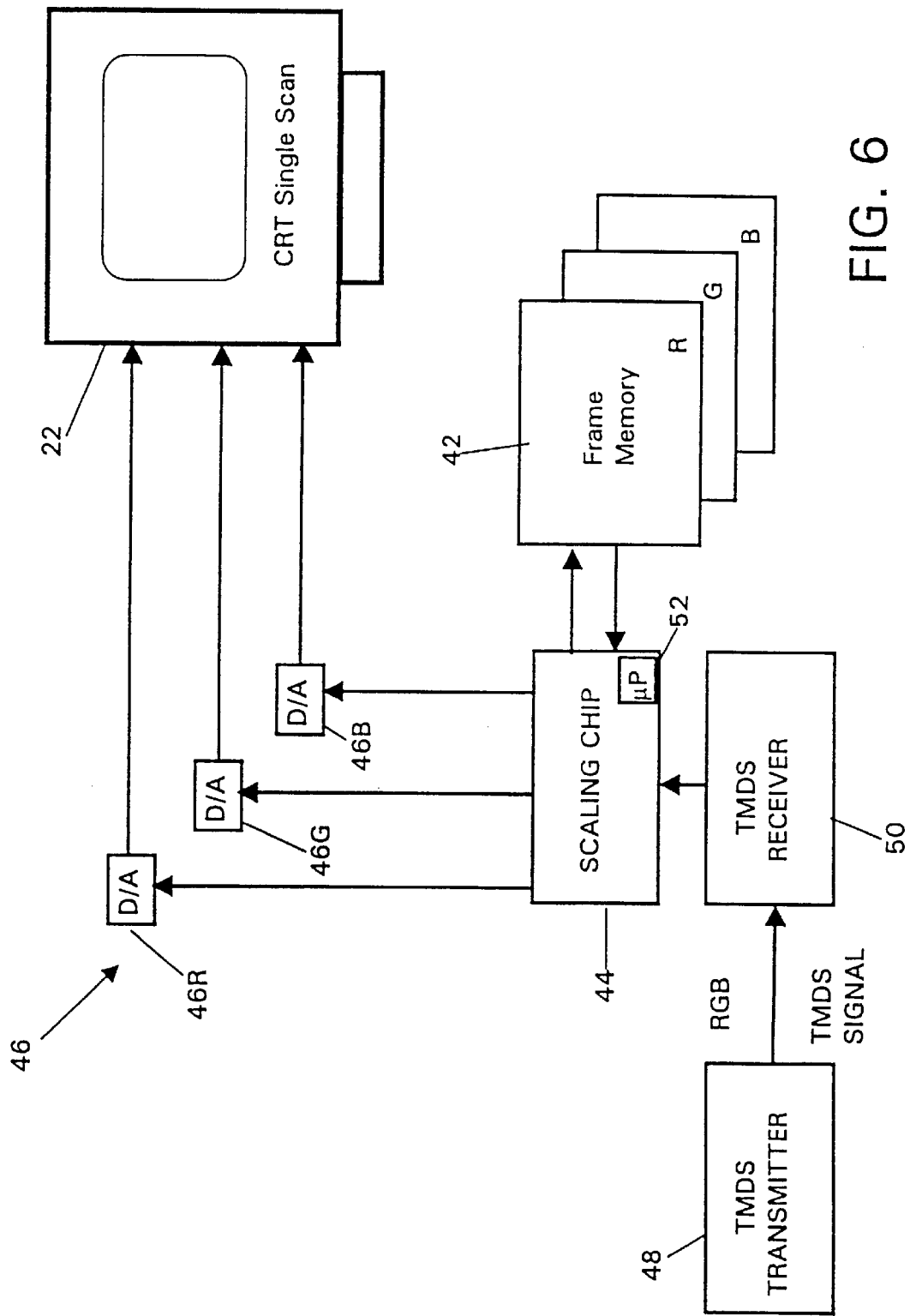
FIG. 6 is a more detailed block diagram of the embodiment of FIG. 5.

Referring now more particularly to FIG. 6, the embodiment of FIG. 5 is shown in more detail for the preferred version. In this preferred version the PC 36 has a digital video interface board 38 that is a TMDS transmitter 48. The digital RGB signals in TMDS format are supplied via a cable or other type of connection to a TMDS receiver 50 within the CRT monitor 22. One suitable receiver would be Genesis Microchip Inc.'s model gmZRX1. The TMDS receiver 50 outputs the initial display signals as 8 bit digital RGB signals to the scaling chip 44. Within the scaling chip 44 is a microprocessor 52 that provides the necessary timing signals and calculations for the scaling functions.

The scaling chip 44 writes digital display data to the frame memory 42 that has separate memory planes for RGB signals. Each memory plane holds, for example, 1024×768 8-bit color "words", for example, depending upon the resolution conversion being undertaken. Output digital display data from the scaling chip 44 in the form of 8 bit color words for each of the RGB signals are supplied at the converted resolution according to the table in FIG. 9A to separate D/A converters 46R, 46G, and 46B, respectively. The RGB analog output display signals from the D/A converters 46R, 46G and 46B are supplied to the monitor 22 for display.

Figure 7:
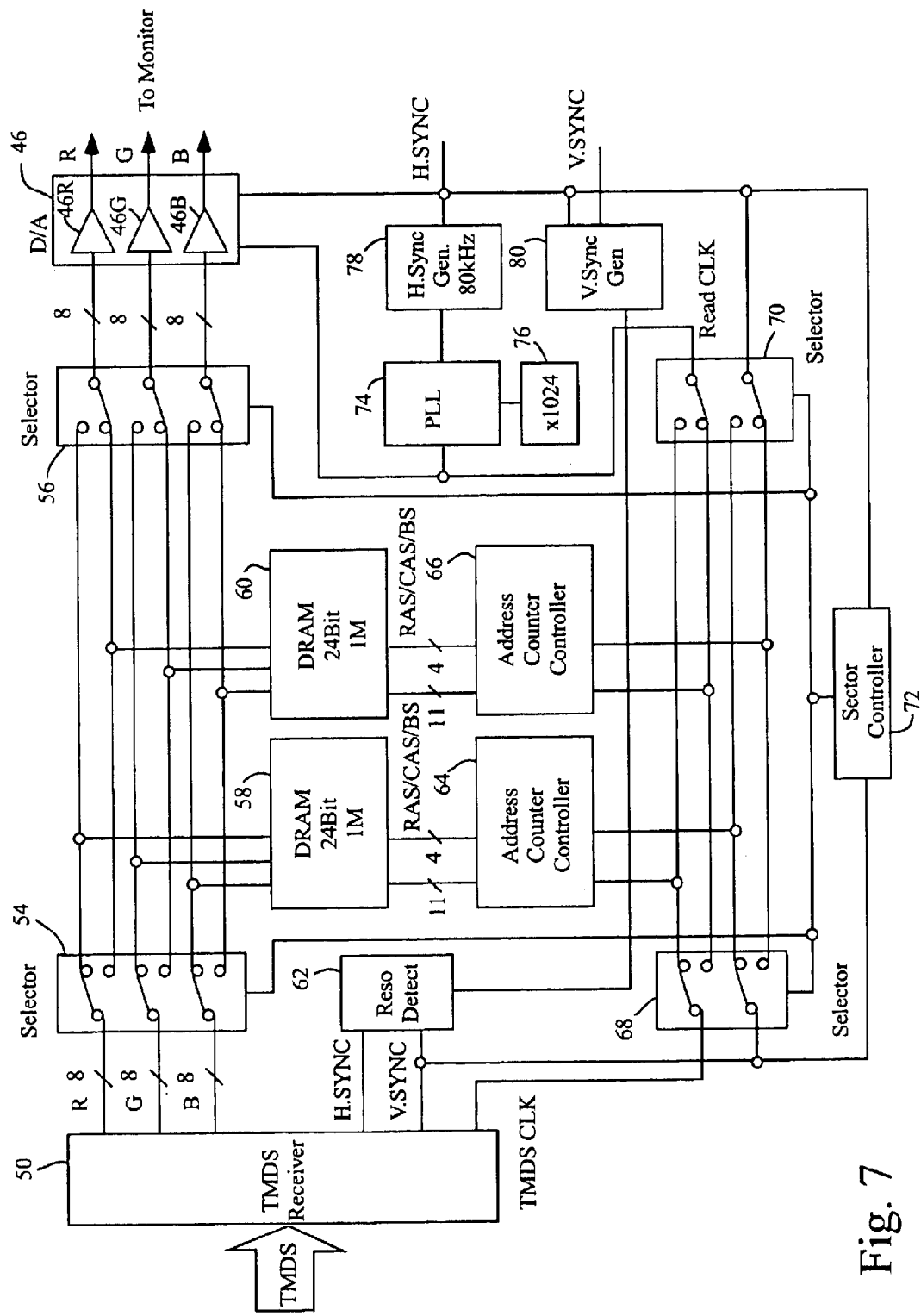
FIG. 7 is a detailed block diagram of a modification of the embodiment of FIG. 5.

Referring now more particularly to FIG. 7, another embodiment of the invention is illustrated. Elements that are common to the previously described embodiments have the same reference numbers and their operation will not be described in further detail. In this embodiment a discrete circuit replaces the scaling chip 44. The eight bit RGB signals output from the TMDS receiver 50 are supplied to a first selector switch 54. The selector switch selectively connects each of the digital RGB signals either to the input/output (I/O) terminals of a first dynamic RAM (DRAM) 58 or to the I/O terminals of a second DRAM 60. DRAMs 58 and 60 constitute a frame memory. A second selector switch 56 connects the I/O terminals of the DRAMs 58 and 60 to the D/A converter 46, comprised of the separate D/A converters 46R, 46G and 46B, which supply analog display signals to the monitor 22.

The TMDS receiver also outputs a horizontal sync signal H.SYNC, a vertical sync signal V.SYNC, and a TMDS clock signal TMDS CLK. The H.SYNC and V.SYNC signals are supplied to a resolution detector 62. The V.SYNC signal is also supplied, along with the TMDS CLK signal, to a third selector switch 68. V.SYNC is further supplied to a sector controller 72. The switch 68 alternatively supplies V.SYNC to an input of either a first address counter controller 64 or a second address counter controller 66. The switch 68 simultaneously also alternatively supplies the TMDS CLK to another input of the first address counter controller 64 or another input of the second address counter controller 66.

The address counter controllers 64 and 66 are connected to the address lines of the DRAMs 58 and 60, respectively, to control the addresses at which display data are stored into and read out from the DRAMs 58 and 60. Also connected to the address counter controllers 64 and 66 is a fourth selector switch 70. A horizontal sync generator 78 generates 80 kHz ("fH") H.SYNC signals which are supplied to the monitor 22, a phase locked loop (PLL) circuit 74, the D/A converter 46, a vertical sync generator 80, the sector controller 72, and the fourth selector switch 70. The PLL 74 receives the H.SYNC signal having the horizontal scanning frequency fH and outputs a data output clock signal (Read CLK) having a frequency equal to the product of fH and a multiplier factor from a resolution multiplier circuit 76. The multiplier factor is equal to the horizontal resolution of the display output signals plus a horizontal blanking interval. In the present example Read CLK=fH×(horizontal resolution)×(a constant). Read CLK is supplied to the switch 70 and to the D/A converter 46. Note that the vertical sync generator 80 is supplied with the output of the resolution detector 62. The vertical sync generator 80 changes the frequency fV of its output V.SYNC signal to the monitor 22 in correspondence with the detected resolution of the initial display signals, as is shown in FIG. 9B.

The sector controller 72 controls the operations of the switches 54, 56, 68 and 70. In operation, the switches 54 and 56 operate synchronously as a first multiplexer so that while selector switch 54 is connected to supply input display signals to be written into DRAM 58, switch 56 is connected to read out stored display signals from DRAM 60 to the monitor 22 through the D/A converter 46. The switches 68 and 70 constitute a second multiplexer and the sector controller 72 controls the switches 68 and 70 to operate synchronously with each other and the switches 54 and 56 so that while the switch 54 is connected to write display data to DRAM 58 and switch 56 is connected to read display data out of DRAM 60, switch 68 is connected to supply the TMDS CLK signal and the V.SYNC signal from the TMDS receiver 50 to address counter controller 64. Simultaneously, the sector controller 72 also causes the switch 70 to supply the Read CLK signal from the PLL 74 and the H.SYNC signal from the horizontal sync generator 78 to the address counter controller 66.

The sector controller 72 also controls the switches 54, 56, 64 and 66 to simultaneously change their connections to be connected to the other of the two DRAMs 58 and 60 and address counter controllers 64 and 66, respectively. In this way, a first set of received digital display data from the receiver 50 are written into DRAM 58 at one resolution and set of frequencies while a second set of received digital display data are read out of DRAM 60 at a different resolution and set of frequencies. Then the process is reversed by causing the switches 54, 56, 68 and 70 to simultaneously change over their connections to the other of the two DRAMs 58 or 60, respectively, and the first set of display data are read out of DRAM 58 at the converted resolution and frequencies while a third set of received display data from the TMDS receiver 50 are stored in the DRAM 60.

Figure 8:
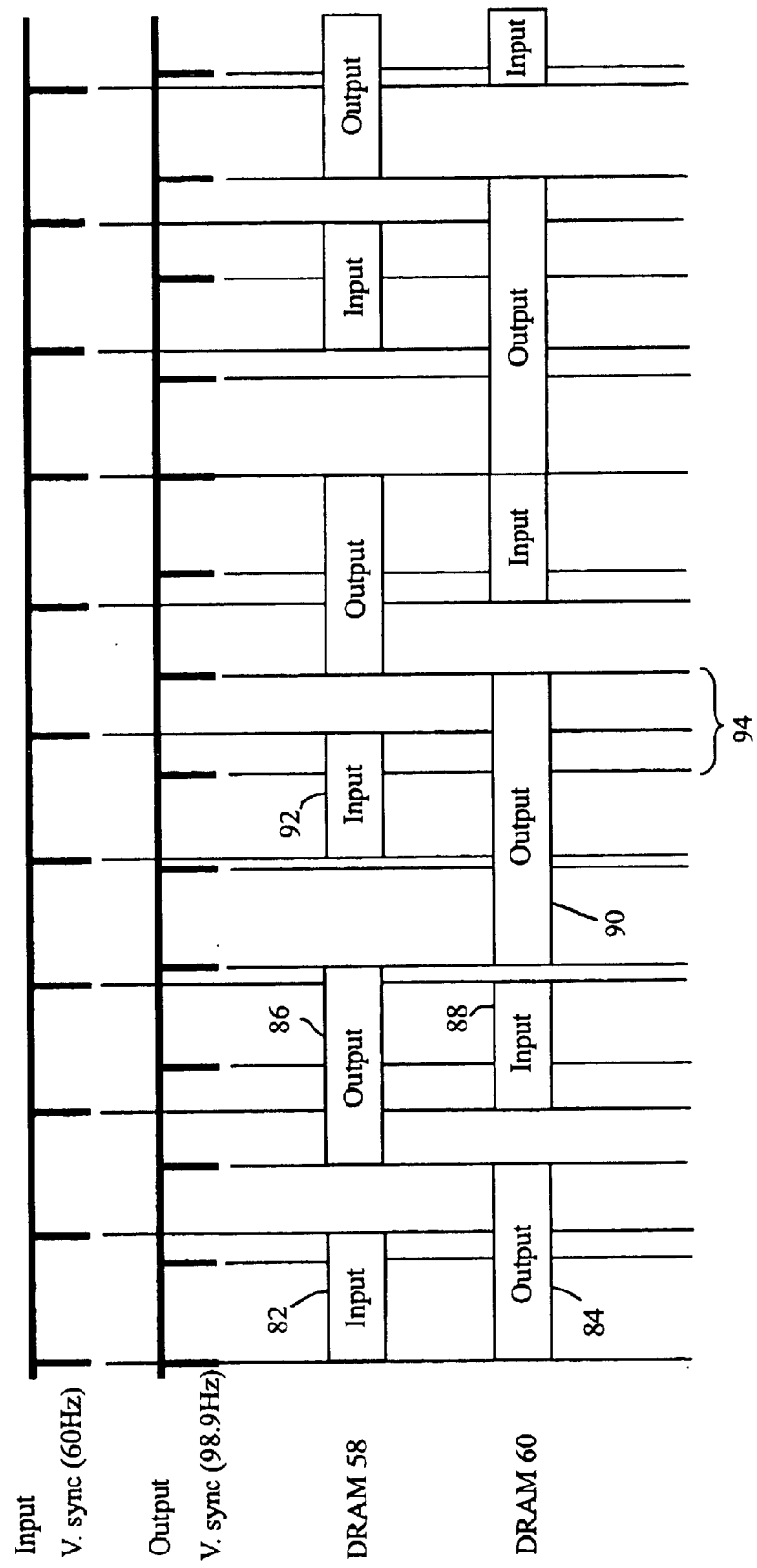
FIG. 8 is a timing diagram for use in explaining the reading and writing operation for the frame memory of the embodiment of FIG. 7.

Referring now more particularly to FIG. 8, the timing of the process for reading and writing to the DRAMs 58 and 60 will be described in more detail. As illustrated in the figure, writing of the input display data received from the Receiver 50 to the frame memory DRAMs 58 and 60 is controlled by the 60 Hz V.SYNC signal from the Receiver 50. In the figure, this is indicated by the first "input" period 82 for DRAM 56. The reading out of data from the DRAMs 58 and 60 to the monitor 22 is synchronized with the 98.9 Hz V.SYNC signal from the V.SYNC generator 80. This is illustrated by the output period 84 when the display data are read out from the DRAM 60. The display data stored in the DRAM 58 are next read out at period 86. It is to be understood that the particular fH and fV values used here are merely examples.

All the display data stored in one of the DRAMs 58 or 60 can be read out in two 98.9 Hz V.SYNC periods, however, the writing time to the DRAMs is shorter in duration. Note that the duration of the output period 84 exceeds the duration of the input period 82. Because the data writing and data reading periods are unequal in duration, after the first data read/write cycle there is a period during which there might be an overlap of reading and writing operations for the same memory. For example, all of the display data may have been read out from one of the DRAMs before all of the data have been input to the other DRAM. In this case, the DRAM being read out is simply read out again so that the same data are redisplayed. This is illustrated in time periods 90 and 92.

After period 86, for example, display data are read out from DRAM 60 for the first two of three consecutive 98.9 Hz V.SYNC periods during period 90. Because DRAM 58 is being written to at the timing of V.SYNC from the Receiver 50, the writing of received display data to DRAM 58 is not completed until more than two 98.9 Hz V.SYNC periods have elapsed since the beginning of period 90. That is, all of the display data have been read out from the DRAM 60 before the process of writing data to the DRAM 58 has been completed during period 92. Thus, DRAM 58 is not ready to be read from at this time. Therefore, the display data once read out from DRAM 60 during the first part of period 90 are again read out for the last 98.9 Hz V.SYNC interval 94 of period 90. The viewer of the monitor 22 is not even aware that the same display data are being repeated. Thereafter, the display data are read out from DRAM 58. This process repeats during every display data read/write cycle thereafter.

Figure 1:
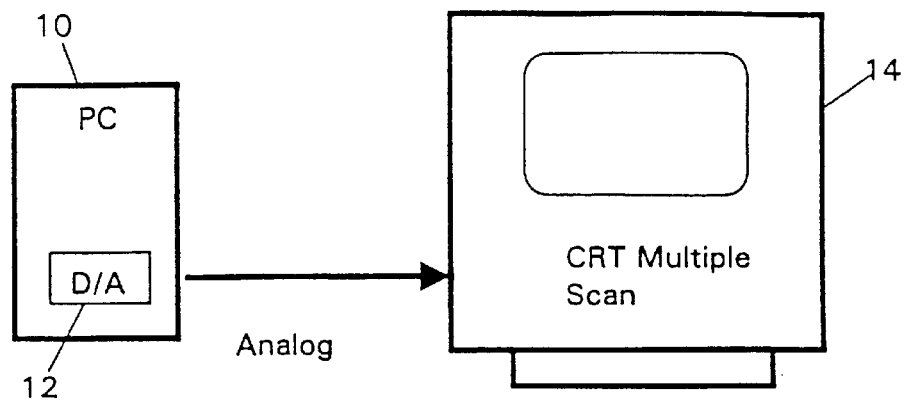
FIG. 1 is a block diagram of a first possible monitor arrangement that employs a CRT monitor capable of multiple scanning frequencies.
Figure 2:
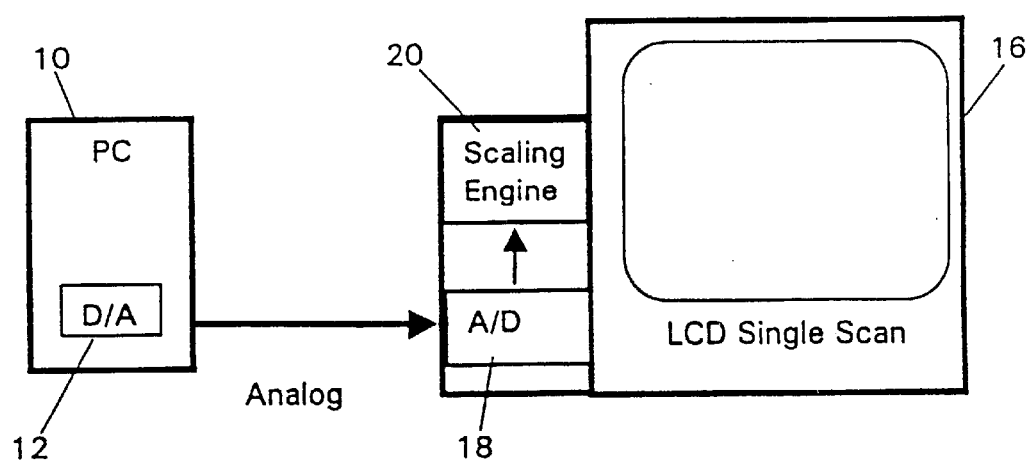
FIG. 2 is a block diagram of a second possible monitor arrangement that employs a LCD monitor that incorporates an A/D converter and a scaling engine.
Figure 3:
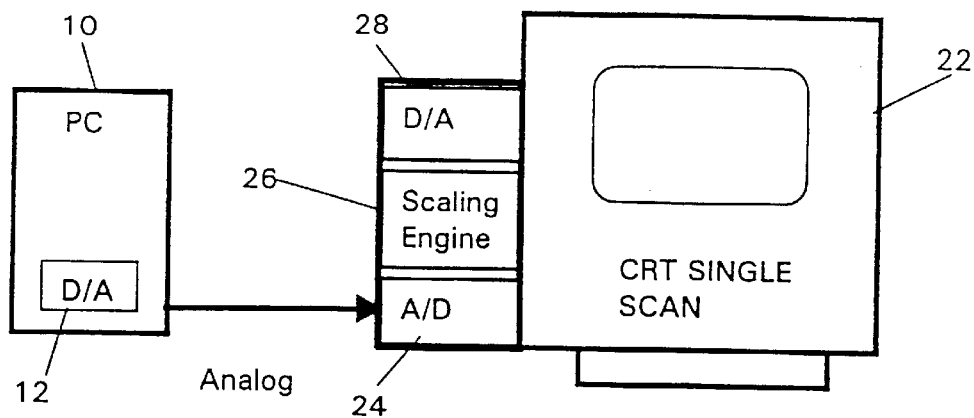
FIG. 3 is a block diagram of a third possible monitor arrangement that employs a CRT single scan monitor.
Figure 4:
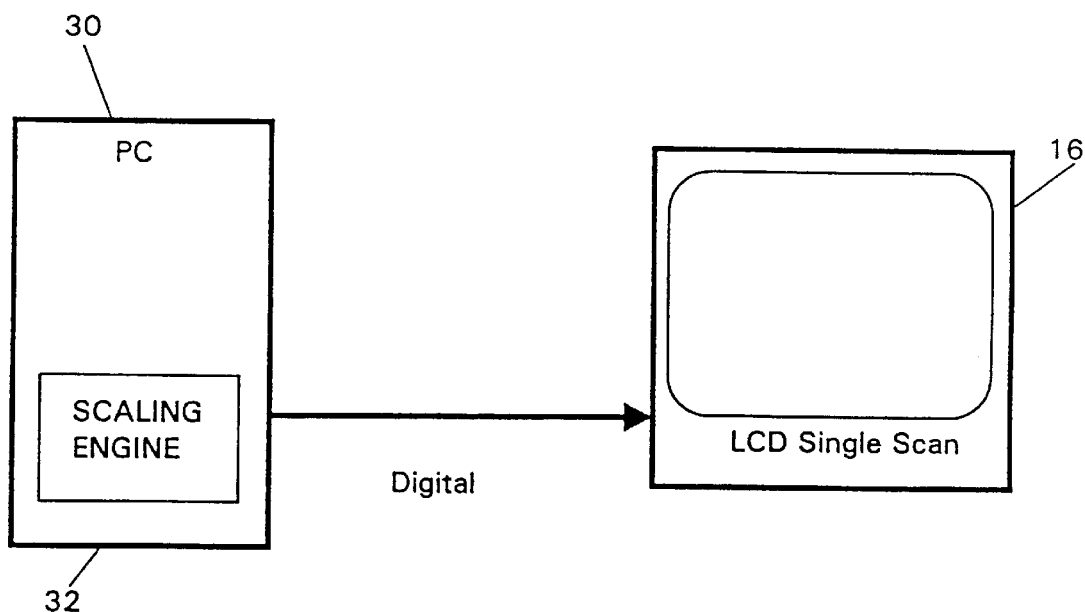
FIG. 4 is a block diagram of a fourth possible monitor arrangement that employs a scaling engine in the PC to supply digital output display signals to an LCD monitor.
Figure 10:
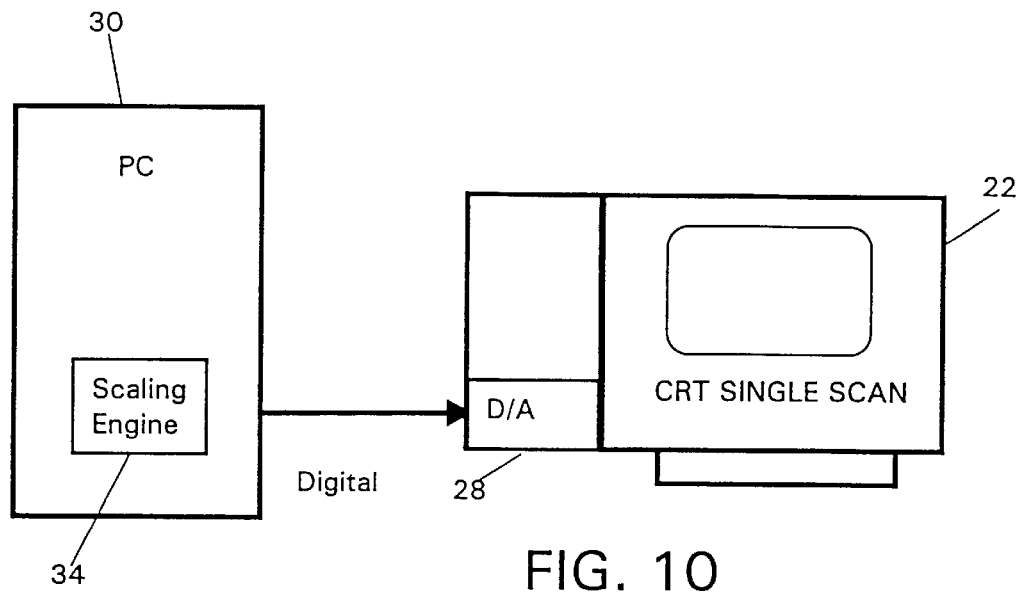
FIG. 10 is a block diagram of a second embodiment of the invention.

In the above-described embodiment, the scaling engine resides in the monitor. However, in another embodiment the scaling engine can reside within the PC. Referring now more particularly to FIG. 10, a second embodiment of the invention includes a PC 30 having a scaling engine 34 incorporated therein. This scaling engine 34 performs the same conversion of the digital display signals output within the PC 30 and outputs the converted digital display signals to a D/A converter 28 of the single horizontal scanning frequency CRT monitor 22 for display. This conversion can be according to the terms of FIG. 9A. The horizontal scanning frequency of the monitor 22 is fH, which in the preferred embodiments described herein is 80 kHz. The scaling engine 34 can also be embodied in an integrated circuit chip of the type described in U.S. Pat. No. 5,602,599 and manufactured by Genesis Microchip Inc., 1999 Concourse Dr., San Jose, Calif. 95131 as models gmZ1, gmZ2, gmZ3, gmZd1, or gmZRX1. Scaling engine 34 can also be a specially programmed microprocessor. Further, the scaling engine 34 can have essentially the same construction as the circuit of FIG. 7 with the TMDS receiver 50 being replaced by the display adapter of the PC 30. In this embodiment, the conversion is according to FIG. 9B.

Described above is a single horizontal scan range CRT monitor that enables a single scan CRT to be economically and conveniently interfaced to PCs having different digital display outputs.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. A single horizontal scan range monitor supplied with initial display signals in a digital format from a computer, the initial display signals having one of a plurality of input resolutions and comprising:

a cathode ray tube (CRT) display having a single horizontal scanning frequency;

a receiver for receiving the initial display signals transmitted from the computer, the initial display signals transmitted in digital format;

a converter supplied with the initial display signals for detecting the input resolution of the initial display signals, converting the initial display signals to digital output signals having a vertical output resolution selected from a plurality of output resolutions matched to the detected input resolution of the initial display signals and the single horizontal scanning frequency of the CRT display and supplying the digital output signals to the CRT display;

wherein the converter includes a frame memory;

wherein the initial display signals are written to the frame memory at the initial resolution and the initial horizontal scanning frequency and read out of the frame memory as the digital display output signals at the single horizontal scanning frequency and the vertical output resolution, wherein the frame memory includes a first frame memory and a second frame memory; and wherein the controller is configured to, arrange the first frame memory as an input frame memory configured to receive the initial display signals at the initial resolution and at the initial horizontal scanning frequency, arrange the second frame memory as an output frame memory configured to output the digital output signals at the single horizontal scanning frequency, and switch operation of the first and second frame memory after a full input frame has been received by the input frame memory and after a full output frame has been output by the output frame memory.

2. A single horizontal scan range monitor according to claim 1, wherein the receiver is a transition minimized differential scaling (TMDS) receiver.

3. A single horizontal scan range monitor according to claim 1, wherein the receiver is a low voltage differential signaling (LVDS) receiver.

4. A single horizontal scan range monitor according to claim 1, wherein the receiver is a low voltage differential signaling display interface (LDI) receiver.

5. A single horizontal scan range monitor according to claim 1, wherein the receiver is a gigabit video interface (GVIF) receiver.

6. A single horizontal scan range monitor according to claim 1, further comprising a digital to analog converter for converting the digital output signals to corresponding analog output signals.

7. A single horizontal scan range monitor according to claim 6, wherein the initial display signals and the digital output signals have corresponding red, green and blue components and wherein the digital to analog converter has separate converters for each color component.

8. A single horizontal scan range monitor according to claim 1, wherein the converter converts the initial digital display signals to digital output signals having one predetermined horizontal resolution regardless of the horizontal resolution of the initial digital display signals.

9. A method for adapting a single horizontal scan range monitor having a single horizontal scanning frequency to receive and then display initial display signals generated by a computer in a digital format having one of a plurality of input resolutions, comprising the steps of:

receiving the initial display signals in the digital format from the computer;

detecting the input resolution of the initial display signals;

converting the initial display signals to digital output signals having a vertical output resolution selected from a plurality of output resolutions matched to the detected input resolution of the initial display signals and the single horizontal scanning frequency;

supplying the digital output signals to the monitor for display;

wherein the converting step includes the steps of writing to and reading from a frame memory;

wherein the converting step includes writing the initial display signals to the frame memory at the input resolution and reading the digital output signals out of the frame memory at the single horizontal scanning frequency and the vertical output resolution;

wherein the frame memory includes a first frame memory and a second frame memory; and wherein the converting step comprises arranging the first frame memory as an input frame memory configured to receive the initial display signals at the input resolution and at a frequency of the initial display signals;

arranging the second frame memory arranged as an output frame memory configured to output the digital output signals at the single horizontal scanning frequency; and switching operation of the first and second frame memory after a full input frame has been received by the input frame memory and after a full output frame has been output by the output frame memory.

10. A method for adapting a single horizontal scan range monitor according to claim 9, wherein the converting step includes converting the initial display signals to digital output signals having a single, predetermined horizontal resolution, irrespective of the horizontal resolution of the initial display signals.

11. A method for adapting a single horizontal scan range monitor according to claim 9, wherein the receiving step includes transition minimized differential scaling (TMDS).

12. A method for adapting a single horizontal scan range monitor according to claim 9, wherein the receiving step includes the step of low voltage differential signaling (LVDS).

13. A method for adapting a single horizontal scan range monitor according to claim 9, wherein the receiving step includes the step of low voltage differential signaling display interfacing (LDI).

14. A method for adapting a single horizontal scan range monitor according to claim 9, wherein the receiving step includes the step of gigabit video interfacing (GVIF).

15. A method for adapting a single horizontal scan range monitor according to claim 9, further comprising the steps of digital to analog converting the digital output signals to corresponding analog output signals.

16. A method for adapting a single horizontal scan range monitor according to claim 15, wherein the initial display signals and the digital output signals have corresponding red, green and blue components and wherein the digital to analog converting step includes separately digital to analog converting each color component.

17. A single horizontal scan frequency range converter circuit comprising:

a frame memory;

a resolution detector for detecting a resolution of initial display signals having an initial horizontal scanning frequency and an initial resolution and outputting a resolution detection signal;

a data output clock generator for generating a data output clock signal as a function of a single horizontal scanning frequency and a horizontal resolution of digital display output signals;

a controller supplied with the initial display signals, the resolution detection signal, and the data output clock signal for controlling writing of the initial display signals to the frame memory at the initial resolution and the initial horizontal scanning frequency and reading the digital display output signals from the frame memory at the single horizontal scanning frequency and at a resolution different from the initial resolution;

wherein the digital display output signals are supplied to a digital display having the single horizontal scanning frequency;

wherein the frame memory includes a first frame memory and a second frame memory; and wherein the controller is configured to, arrange the first frame memory as an input frame memory configured to receive the initial display signals at the initial resolution and the initial horizontal scanning frequency, arrange the second frame memory as an output frame memory configured to output the digital display output signals at the single horizontal scanning frequency and at the resolution different from the initial resolution, and switch operation of the first and second frame memory after a full input frame has been received by the input frame memory and after a full output frame has been output by the output frame memory.

18. A single horizontal scan range converter circuit according to claim 17, wherein the resolution detector, data output clock generator and the controller are embodied in an integrated circuit.

19. A single horizontal scan frequency range converter circuit comprising:

a frame memory;

a resolution detector for detecting a resolution of initial display signals having an initial horizontal scanning frequency and an initial resolution and outputting a resolution detection signal;

a data output clock generator for generating a data output clock signal as a function of a single horizontal scanning frequency and a horizontal resolution of digital display output signals;

a controller supplied with the initial display signals, the resolution detection signal, and the data output clock signal for controlling writing of the initial display signals to the frame memory at the initial resolution and the initial horizontal scanning frequency and reading the digital display output signals from the frame memory at the single horizontal scanning frequency and at a resolution different from the initial resolution;

wherein the initial display signals are received from an external source that includes a transmitter for transmitting the initial display signals in a digital format and wherein the single horizontal scan range converter circuit further includes a receiver for receiving the initial display signals and supplying them to the controller;

Wherein the frame memory includes a first frame memory and a second frame memory; and wherein the controller is configured to,
arrange the first frame memory as an input frame memory configured to receive the initial display signals at the initial resolution and the initial horizontal scanning frequency,
arrange the second frame memory as an output frame memory configured to output the digital display output signals at the single horizontal scanning frequency at the resolution different from the initial resolution, and
switch operation of the first and second frame memory after a full input frame has been received by the input frame memory and after a full output frame has been output by the output frame memory.

20. A method for converting initial display signals at one of a plurality of initial resolutions and one of a plurality of initial horizontal scanning frequencies to digital display outputs signals having a single horizontal scanning frequency and a single, predetermined resolution matched to the one of the plurality of initial resolutions, comprising the steps of:

detecting the initial resolution of the initial display signals;

generating a data output clock signal as a function of a single horizontal scanning frequency and a horizontal resolution of the digital display output signals;

using the initial display signals, the resolution detection signal, and the data output clock signal for controlling writing of the initial display signals to a frame memory at the initial resolution and the initial horizontal scanning frequency and reading the digital display output signals from the frame memory at the single horizontal scanning frequency and at a resolution different from the initial resolution, the frame memory having a first frame memory and second frame memory;

further comprising the step of generating the data output clock signal using a phase clocked loop (PLL) circuit as the product of the single horizontal scanning frequency and a multiplier factor corresponding to the sum of the desired horizontal resolution and a horizontal blanking interval; and further comprising the steps of
arranging the first frame memory as an input frame memory configured to receive the initial display signals at the initial resolution and the initial horizontal scanning frequency;
arranging the second frame memory as an output frame memory configured to output the digital display output signals at the single horizontal scanning frequency and at the resolution different from the initial resolution; and
switching operation of the first and second frame memory after a full input frame has been received by the input frame memory and after a full output frame has been output by the output frame memory.

21. A single horizontal scan range monitor supplied with initial display signals in a digital format from an external source, the initial display signals having one of a plurality of input resolutions and comprising:

a cathode ray tube (CRT) display having a single horizontal scanning frequency and a converter supplied with the initial display signals for detecting the input resolution of the initial display signals, converting the initial display signals to digital output signals having a vertical output resolution selected from a plurality of output resolutions matched to the detected input resolution of the initial display signals and the single horizontal scanning frequency of the CRT display and supplying the digital output signals to the CRT display;

wherein:
said converter includes a first frame memory, a second frame memory, and a controller;
said controller configured to,
arrange the first frame memory as a input frame memory configured to receive the display signal at the initial resolution and at a frequency of the input display signals,
arrange the second frame memory as an output frame memory configured to output the display signals at a frequency of the selected output resolution, and
switch operation of the first and second frame memory after a full input frame has been received by the input frame memory and after a full output frame has been output by the output frame memory.

22. The single horizontal scan range monitor according to claim 21, wherein:
the output frame memory is configured to output entire contents of the output frame memory, and
the controller is further configured to re-output content of the output frame memory during additional periods of the selected output frequency until the input frame memory has received a full input frame during a period of a frequency of the input display signals.

23. A single horizontal scan range monitor supplied with initial display signals in a digital format from a computer, the initial display signals having one of a plurality of input resolutions and comprising:

a cathode ray tube (CRT) display having a single horizontal scanning frequency;

a receiver for receiving the initial display signals transmitted from the computer, the initial display signals transmitted in digital format;

a converter supplied with the initial display signals for detecting the input resolution of the initial display signals, converting the initial display signals to digital output signals having a different vertical output resolution selected from a plurality of different output resolutions matched to the detected input resolution of the initial display signals and the single horizontal scanning frequency of the CRT display and supplying the digital output signals to the CRT display;

wherein the converter includes a frame memory;
wherein the initial display signals are written to the frame memory at the initial resolution and the initial horizontal scanning frequency and read out of the frame memory as the digital display output signals at the single horizontal scanning frequency and at a different vertical scanning frequency;
wherein the frame memory includes a first frame memory and a second frame memory; and said controller configured to,
arrange the first frame memory as an input frame memory configured to receive the initial display signals at the initial resolution and at the initial horizontal scanning frequency,
arrange the second frame memory as an output frame memory configured to output the digital display output signals at the single horizontal scanning frequency and according to the different vertical scanning frequency, and
switch operation of the first and second frame memory after a full input frame has been received by the input frame memory and after a full output frame has been output by the output frame memory.

24. A single horizontal scan range monitor supplied with initial display signals in a digital format from a computer, the initial display signals having one of a plurality of input resolutions and comprising:
a cathode ray tube (CRT) display having a single horizontal scanning frequency;
a receiver for receiving the initial display signals transmitted from the computer, the initial display signals transmitted in digital format;
a converter supplied with the initial display signals for detecting the input resolution of the initial display signals, converting the initial display signals to digital output signals having a vertical output resolution selected from a plurality of output resolutions matched to the detected input resolution of the initial display signals and the single horizontal scanning frequency of the CRT display and supplying the digital output signals to the CRT display;
wherein the converter converts the initial display signals having an initial vertical scanning frequency to the output display signals having a different vertical scanning frequency;
said converter includes a first frame memory, a second frame memory, and a controller;
said controller configured to,
arrange the first frame memory as an input frame memory configured to receive the initial display signals at the input resolution and at the initial vertical scanning frequency,
arrange the second frame memory as an output frame memory configured to output the digital output signals in accordance with the different vertical scanning frequency; and
switch operation of the first and second frame memory after a full output frame has been output by the output frame memory.

25. A method for adapting a single horizontal scan range monitor having a single horizontal scanning frequency to receive and then display initial display signals generated by a computer in a digital format having one of a plurality of input resolutions, comprising the steps of:
receiving the initial display signals in the digital format from the computer;
detecting the input resolution of the initial display signals;
converting the initial display signals to digital output signals having a vertical output resolution selected from a plurality of different output resolutions matched to the detected input resolution of the initial display signals and the single horizontal scanning frequency;
supplying the digital output signals to the monitor for display;
wherein the converting step includes the steps of writing to and reading from a frame memory;
wherein the converting step includes writing the initial display signals to the frame memory at the input resolution and reading the digital output signals out of the frame memory at the single horizontal scanning frequency and at a different vertical scanning frequency;
wherein the frame memory includes a first frame memory and a second frame memory; and
wherein the converting step comprises
writing the initial display signals to the first frame memory arranged as an input frame memory at the input resolution at a frequency of the initial display signals;
reading the digital output signals from the second frame memory arranged as an output frame memory at the single horizontal scanning frequency and in accordance with the different vertical scanning frequency; and
switching operation of the first and second frame memory after a full input frame has been received by the input frame memory and after a full output frame has been output by the output frame memory.

26. A method for adapting a single horizontal scan range monitor having a single horizontal scanning frequency to receive and then display initial display signals generated by a computer in a digital format having one of a plurality of input resolutions, comprising the steps of:
receiving the initial display signals in the digital format from the computer;
detecting the input resolution of the initial display signals;
converting the initial display signals to digital output signals having a vertical output resolution selected from a plurality of different output resolutions matched to the detected input resolution of the initial display signals and the single horizontal scanning frequency;
supplying the digital output signals to the monitor for display; and
wherein the converting step includes converting the initial display signals having an initial vertical scanning frequency to the digital output signals having a different vertical scanning frequency; and
wherein the converting step comprises
arranging the first frame memory as an input frame memory configured to receive the initial display signals at the input resolution and at the initial vertical scanning frequency;
arranging a second frame memory as an output frame memory configured to output the display output signals at the single horizontal scanning frequency and in accordance with the different vertical scanning frequency; and
switching operation of the first and second frame memory after a full input frame has been received by the input frame memory and after a full output frame has been output by the output frame memory.

27. A single horizontal scan range monitor according to claim 1. wherein;
the output frame memory is configured to output entire contents of the output frame memory, and
the controller Is further configured to re-output contents of the output frame memory during additional periods of the output frequency until the input frame memory has received a full input frame during a period of a frequency of the input display signals.

28. A single horizontal scan range monitor according to claim 9, wherein:

the output frame memory a configured to output entire contents of the output frame memory, and the controller is further configured to re-output contents of the output frame memory during additional periods of the output frequency until to input frame memory has received a full input frame during a period of the frequency of the input display signals.

29. A single horizontal scan range monitor according to claim 17, wherein:

the output frame memory is configured to output entire contents of the output frame memory, and the controller is further configured to re-output contents of the output frame memory during additional periods of the output frequency until the input frame memory has received a full input frame during a period of a frequency of the input display signals.

30. A single horizontal scan range monitor according to claim 19, wherein:

the output frame memory is configured to output entire contents of the output frame memory, and the controller is further configured to re-output contents of the output frame memory during additional periods of the output frequency until the input frame memory has received a full input frame during a period of a frequency of the input display signals.

31. A single horizontal scan range monitor according to claim 20, wherein:

the output frame memory is configured to output entire contents of the output frame memory, and the controller is further configured to re-output contents of the output frame memory during additional periods of the output frequency until the input frame memory has received a full input frame during period of a frequency of the input display signals.

32. A single horizontal scan range monitor according to claim 23, wherein:

the output frame memory is configured to output entire contents of the output frame memory, and the controller is further configured to re-output contents of the output frame memory during additional periods of the output frequency until the input frame memory has received a full input frame during a period of a frequency of the input display signals.

33. A single horizontal scan range monitor according to claim 29, wherein:

the output frame memory is configured to output entire contents of the output frame memory, and the controller is further configured to re-output contents of the output frame memory during additional periods of the output frequency until the input frame memory has received a full input frame during a period of a frequency of the input display signals.

34. A single horizontal scan range monitor according to claim 25, wherein:

the output frame memory is configured to output entire contents of the output frame memory, and the controller is further configured to re-output contents of the output frame memory during additional periods of the output frequency until the input frame memory has received a full input frame during a period of the frequency of the input display signals.

35. A single horizontal scan range monitor according to claim 26, wherein:

the output frame memory is configured to output entire contents of the output frame memory, and the controller is further configured to re-output contents of the output frame memory during additional periods of the output frequency until the input frame memory has received a full input frame during a period of a frequency of the input display signals.

36. A sinqle horizontal scan range monitor according to claim 1, further comprising:

a clock generator for generating an output vertical scanning frequency different than an input vertical scanning frequency, the output vertical scanning frequency based upon the detected input resolution.

37. A single horizontal scan range monitor according to claim 36, wherein the second frame memory is configured to output the digital output signals synchronized with the output vertical scanning frequency.

38. A method for adapting a single horizontal scan range monitor according to claim 9, further comprising the step of:

generating an output vertical scanning frequency different than an input vertical scanning frequency, the output vertical scanning frequency based upon the detected input resolution.

39. A method for adapting a single horizontal scan range monitor according to claim 38, wherein the second frame memory is configured to output the digital output signals synchronized with the output vertical scanning frequency.

40. A single horizontal scan frequency range converter circuit according to claim 17, further comprising:

a clock generator for genernting an output vertical scanning frequency different than an input vertical scanning frequency, the output vertIcal scanning frequency based upon the detected input resolution.

41. A single horizontal scan frequency range converter circuit according to claim 40, wherein the second frame memory is configured to output the digital display output signals synchronized with the output vertical scanning frequency.

42. A single horizontal scan frequency range converter circuit according to claim 19, further comprising:

clock generator for generating an output vertical scanning frequency different than an input vertical scanning frequency, the output vertical scanning frequency based upon the detected input resolution.

43. A single horizontal scan frequency range converter circuit according to claim 42, wherein the second frame memory is configured to output the digital display output signals synchronized with the output vertical scanning frequency.

44. A method according to claim 20, further comprising the step of:

generating an output vertical scanning frequency different than an input vertical scanning frequency, the output vertical scanning frequency based upon the detected input resolution.

45. A method according to claim 44, wherein the second frame memory is configured to output the digital display output signals synchronized with the output vertical scanning frequency.

46. A single horizontal scan range monitor according to claim 21, further comprising:

a clock generator for generating an output vertical scanning frequency different than an input vertical scanning frequency, the output vertical scanning frequency based upon the detected input resolution.

47. A single horizontal scan range monitor according to claim 46, wherein the second frame memory is configured to output the digital output signals synchronized with the output vertical scanning frequency.

* * * * *

UNITED STATES PATENT AND TRADEMARK OFFICE
CERTIFICATE OF CORRECTION

PATENT NO.   : 6,816,131 B2
DATED        : November 9, 2004
INVENTOR(S)  : Narui et al.

It is certified that error appears in the above-identified patent and that said Letters Patent is hereby corrected as shown below:

<u>Column 8,</u>
Line 27, after "memory" insert -- and a controller --.
Line 45, change "afull" to -- a full --.

<u>Column 11,</u>
Line 49, change "clocked" to -- locked --.

<u>Column 12,</u>
Line 20, change "a" to -- an --.
Line 35, change "content" to -- contents --.
Lines 53 and 54, delete "different".
Line 59, after "includes" insert -- a controller and --.

<u>Column 13,</u>
Lines 49-50, after "memory" insert -- after a full input frame has been received by the input frame memory and --.

<u>Column 14,</u>
Line 63, change "Is" to -- is --.

<u>Column 15,</u>
Line 3, change "a" to -- is --.
Line 47, change "29" to -- 24 --.

UNITED STATES PATENT AND TRADEMARK OFFICE
CERTIFICATE OF CORRECTION

PATENT NO. : 6,816,131 B2
DATED : November 9, 2004
INVENTOR(S) : Narui et al.

It is certified that error appears in the above-identified patent and that said Letters Patent is hereby corrected as shown below:

<u>Column 16,</u>
Line 6, change "sinqle" to -- single --.
Line 29, change "vertlcal" to -- vertical --.

Signed and Sealed this

Second Day of August, 2005

JON W. DUDAS
*Director of the United States Patent and Trademark Office*